(12) United States Patent
Williams et al.

(10) Patent No.: US 8,117,340 B2
(45) Date of Patent: Feb. 14, 2012

(54) TRANS-NETWORK ROAMING AND RESOLUTION WITH WEB SERVICES FOR DEVICES

(75) Inventors: William R. Williams, Renton, WA (US); Shannon J. Chan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 984 days.

(21) Appl. No.: 11/291,062

(22) Filed: Nov. 30, 2005

(65) Prior Publication Data

US 2006/0242322 A1   Oct. 26, 2006

Related U.S. Application Data

(60) Provisional application No. 60/674,619, filed on Apr. 25, 2005.

(51) Int. Cl.
*G06F 15/16* (2006.01)

(52) U.S. Cl. ...................................................... 709/245

(58) Field of Classification Search .................. 370/401, 370/466, 389, 352, 392, 467, 474, 475, 432; 709/245, 238, 230, 223, 229, 227, 246, 224, 709/203, 226; 455/466
See application file for complete search history.

(56) References Cited

U.S. PATENT DOCUMENTS

| | | | |
|---|---|---|---|
| 5,745,699 A | 4/1998 | Lynn et al. | |
| 6,201,962 B1 | 3/2001 | Sturniolo et al. | |
| 6,243,581 B1 | 6/2001 | Jawanda | |
| 6,338,081 B1 * | 1/2002 | Furusawa et al. | 709/202 |
| 6,633,761 B1 * | 10/2003 | Singhal et al. | 455/436 |
| 7,113,599 B2 * | 9/2006 | Neves et al. | 380/270 |
| 7,260,638 B2 * | 8/2007 | Crosbie | 709/229 |
| 7,277,914 B2 * | 10/2007 | Takeshima et al. | 709/203 |
| 2001/0034831 A1 * | 10/2001 | Brustoloni et al. | 713/151 |
| 2001/0044305 A1 | 11/2001 | Freddy et al. | |
| 2001/0047407 A1 | 11/2001 | Moore et al. | |
| 2003/0236883 A1 | 12/2003 | Takeshima et al. | |
| 2004/0086123 A1 | 5/2004 | Neves et al. | |
| 2004/0100923 A1 | 5/2004 | Yam | |
| 2004/0120294 A1 | 6/2004 | Yang et al. | |
| 2004/0170153 A1 | 9/2004 | Stewart et al. | |
| 2004/0229608 A1 | 11/2004 | Isukapalli et al. | |
| 2004/0249911 A1 * | 12/2004 | Alkhatib et al. | 709/223 |
| 2005/0009517 A1 | 1/2005 | Maes | |

(Continued)

FOREIGN PATENT DOCUMENTS

GB        2367980        4/2002

(Continued)

OTHER PUBLICATIONS

J. Rosenberg et al., "Simple Traversal of User Datagram Protocol (UDP) Through Network Address Translators (NATs)," RFC 3489, pp. 3-21.*

(Continued)

*Primary Examiner* — Jeffrey Pwu
*Assistant Examiner* — Saad A Waqas (57) ABSTRACT

Systems and methods are provided that facilitate automated network address determinations and communications between roaming peers. In one aspect, a network communications system is provided. The system includes methods for updating a resolution provider with a current host transport address and for determining a roaming hosts service address and port information. Other processes include opening and mapping ports through a traversal component which can include Network Address Translators and Firewalls and opening/mapping ports in conjunction with cascaded Network Address Translators.

13 Claims, 10 Drawing Sheets

U.S. PATENT DOCUMENTS

| | | | |
|---|---|---|---|
| 2005/0078705 A1 | 4/2005 | Ito | |
| 2005/0108417 A1* | 5/2005 | Haumont | 709/232 |
| 2006/0098611 A1* | 5/2006 | Joshi et al. | 370/338 |
| 2006/0133341 A1* | 6/2006 | Chari et al. | 370/338 |
| 2006/0242322 A1 | 10/2006 | Williams et al. | |
| 2007/0223420 A1* | 9/2007 | Hori et al. | 370/331 |
| 2010/0085920 A1* | 4/2010 | Chari et al. | 370/328 |

FOREIGN PATENT DOCUMENTS

| | | | |
|---|---|---|---|
| GB | 2367980 A | | 4/2002 |
| GB | 2400269 A | | 10/2004 |
| WO | 0044148 A1 | | 9/2000 |
| WO | 0054475 A1 | | 9/2000 |
| WO | WO-0056034 | | 9/2000 |
| WO | 0131472 A1 | | 5/2001 |
| WO | WO 01/31472 A1 | | 5/2001 |
| WO | WO-0131472 | | 5/2001 |
| WO | 02077842 A1 | | 10/2002 |
| WO | WO 02/077842 A1 | | 10/2002 |
| WO | WO-02077842 | | 10/2002 |
| WO | 03069872 A1 | | 8/2003 |
| WO | 03094366 A2 | | 11/2003 |
| WO | WO-03094366 | | 11/2003 |
| WO | WO2005018252 | | 2/2005 |

OTHER PUBLICATIONS

Global Network & Unified Access. www.goremote.com/solutions/access.php?p=s13. Last accessed Nov. 30, 2005. 3 pages. 2004, GoRemote Internet Communications, Inc.

Wireless Networking: Research & Development. www.bell-labs.com/research/wireless2.html. Last accessed Nov. 30, 2005. 1 page. 2002, Lucent Technologies.

Tatara Service Manager. www.tatarasystems.com/contentmgr/showdetails.php/id/322. Last accessed Nov. 30, 2005. 1 page.

International Search Report and Written Opinion for PCT Application No. PCT/US2006/015722 dated Mar. 26, 2008, 14 pgs.

Chinese Office Action from Chinese Patent Application 200680010303.5 dated Sep. 26, 2010.

"Foreign Office Action", Australian Application No. 2006241233, (Jan. 20, 2011),2 pages.

"Foreign Office Action", Egyptian Application No. 1158/2007, (Jan. 24, 2011),5 pages.

"Foreign Office Action", Egyptian Application No. 1158/2007, (Jun. 12, 2010),4 pages.

"Foreign Office Action", Mexican Application No. MX/a/2007/011867, (Nov. 4, 2010),6 pages.

Rosenberg, J. et al., "STUN—Simple Traversal of User Datagram Protocol (UDP) Through Network Address Translators (NATS)", Retrieved from: <http://www.ietf.org/rfc/rfc3489.txt> on Feb. 23, 2011, RFC 3489,(Mar. 2003),44 pages.

"Foreign Office Action", Egyptian Application No. 1158/2007, (Aug. 4, 2011),4 pages.

"Foreign Office Action", Chinese Application No. 200680010303.5, (Aug. 31, 2011), 6 pages.

"Foreign Office Action"Japanese Application No. 2008-509063, (Sep. 27, 2011), 4 pages.

"Foreign Office Action", Mexican Application No. MX/a/2007/011867, (Jun. 15, 2011), 8 pages.

* cited by examiner

TRANS-NETWORK ROAMING AND RESOLUTION WITH WEB SERVICES FOR DEVICES

CROSS-REFERENCE TO RELATED APPLICATIONS

This application claims the benefit of U.S. Provisional Application No. 60/674,619, filed Apr. 25, 2005 and entitled TRANS-NETWORK ROAMING AND RESOLUTION WITH WEB SERVICES FOR DEVICES. The entirety of this application is incorporated herein by reference.

BACKGROUND

A network address translator (NAT) is a device that can translate Internet Protocol (IP) addresses and TCP/UDP port numbers of data packets as the packets are forwarded. For example, a small business network with multiple computers that connect to the Internet may employ an NAT for such connections. This type business would normally have to obtain a public IP address for each computer on the network from an Internet service provider (ISP). With the NAT, however, the small business can use private addressing and have the NAT map its private addresses to single or to multiple public IP addresses. The NAT is a common solution for the following combination of requirements: leveraging the use of a single connection, rather than connecting multiple computers, to the Internet; using private addressing; and providing access to Internet resources without having to deploy a proxy server. Also, these translators provide a type of firewall protection by hiding internal IP addresses and they enable companies to employ more internal IP addresses since there is no possibility of conflict with addresses outside the companies' private domain.

One major obstacle in NAT technology is that there is a plurality of differing protocols that may be employed for translating network traffic. For instance, many consumer or home systems utilize Cone, Full Cone, or Restricted Cone NAT technologies whereby some routers may behave as a Cone NAT for UDP traffic and behave as a symmetric NAT for TCP traffic. In corporate situations, symmetric NAT along with hardware or software firewalls are more likely to be employed. Currently, in order to communicate over the differing types of protocols, intense manual configurations are required to properly configure the NAT to communicate over one of the above mentioned protocols. However, many network situations may require more than one protocol to be employed in order for communications to occur between remote applications.

Other problems occur as hosts move from one network to another, wherein the hosts may rely on the local network to assign their network address. This address may be a complete routable address on the Internet, or it may be an un-routable address that is behind a Network Address Translation (NAT) system. These hosts have what is commonly known as a Dynamic IP addresses or a NAT'ed IP address. Devices with a NAT'ed IP address generally do not have the ability to accept incoming TCP connections for services unless they have some method of registering a port to be remapped by the NAT system for that specific host service. It is generally not possible for another host on the Internet to discover this assigned address or mapped port for that service using normal address discovery means such as a Domain Name System (DNS) or service. While some services exist to solve Dynamic IP problems (Dynamic DNS), they generally do not function with caching DNS servers and also they generally cannot resolve dynamic port numbers.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

Systems and methods are provided for automatically determining and configuring communications capabilities between roaming or mobile network devices. Problems with conventional systems having to manually configure and pre-register with a large server system are mitigated by creating a resolution service that hosts can employ to discover an Internet Protocol (IP) address and port number of an associated roaming service along with additional service information. For instance, after a device or component has obtained an IP address and mapped a port through a Network Address Translator (NAT) system, the device can contact the respective resolution service and thus register its corresponding IP/Port pair in an automatic manner. The resolution service or another resolution service can also be employed to automatically/dynamically locate other network components of interest. The resolution service can exist at a static IP address and at a well known port number if desired, but can also include dynamic components using a DYN-DNS (Dynamic Domain Name Service), for example via a well-known or predetermined port identity. Other resolution methods can be employed to resolve the resolution services itself (e.g., PNRP can be used to find the resolution service).

The resolution service can be resolved using a standard DNS or Dynamic DNS and can optionally resolve using Peer Network Resolution Protocol. Hosts interested in contacting services on roaming hosts would generally contact a resolution provider or service to determine the last known IP address and port for roaming devices. These mobile hosts can then directly contact the service at that IP/Port pair. One benefit of this solution over other possible solutions is that it generally does not require a central server or Internet infrastructure modifications. A specific example of a problem solved includes when two or more laptops are traveling around the world with a Web Service Host on one laptop and a Web Service client on another. These laptops are roaming guests on "public" networks such as Hotel and hotsport in one specific example. Thus, one laptop has raw material pricing information, and the other employs raw material to dynamically generate sales price guidance for sales personnel. As can be appreciated, various applications can be supported such as antiques or wine futures, for example. Other aspects of the system include NAT traversal systems and methods such that cascaded NAT components can be traversed in one example to support various automated address determinations and configurations.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Systems and methods are provided that facilitate automated network address determinations and communications between roaming peers. In one aspect, a network communications system is provided. The system includes methods for updating a resolution provider with a current host address and for determining a roaming hosts service address and port information. Other processes include opening ports through Network Address Translators and opening ports in conjunction with cascaded Network Address Translators.

As used in this application, the terms "component," "translator,""system," "object," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
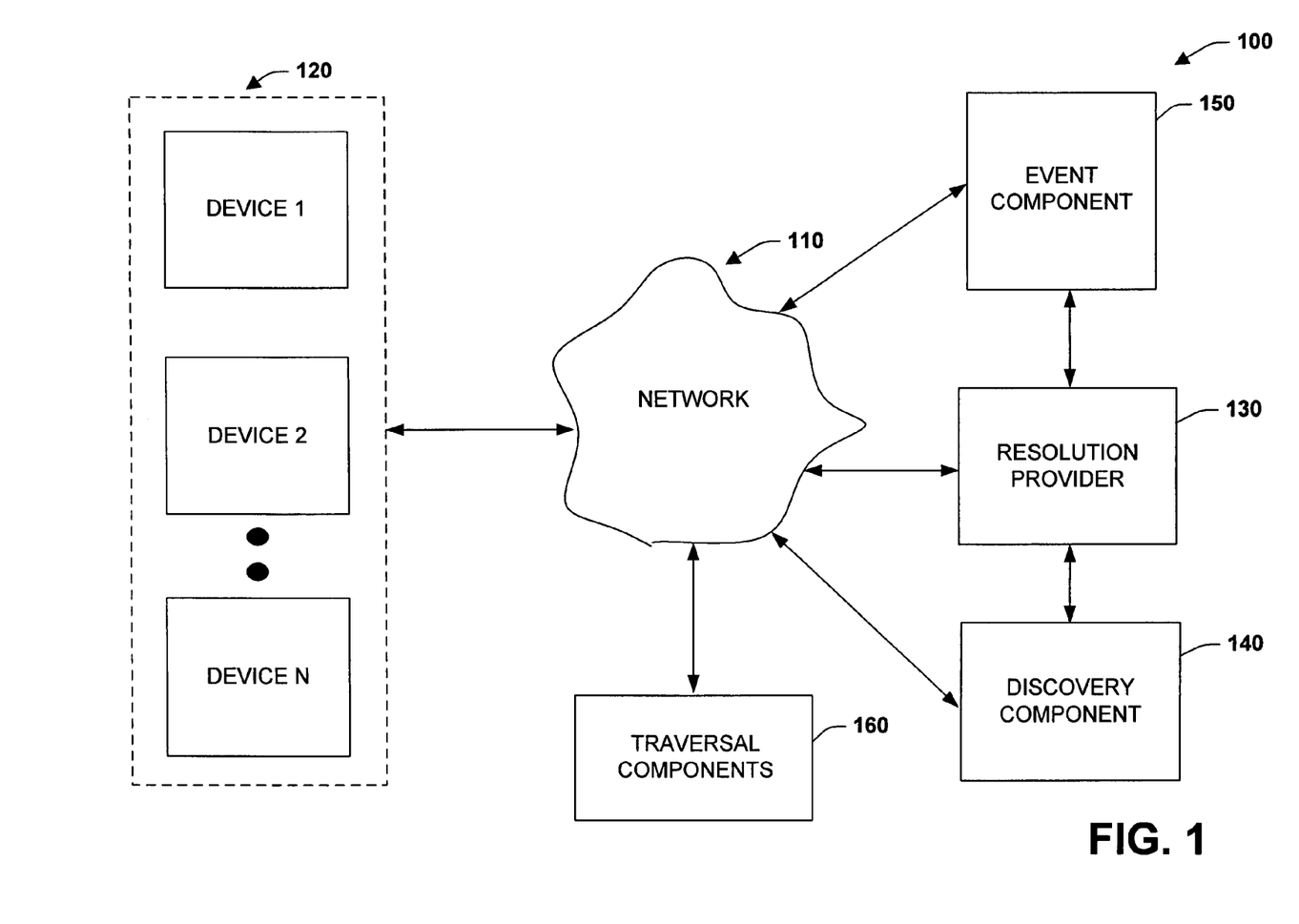
FIG. 1 is a schematic block diagram illustrating a network roaming and resolution system.

Referring initially to FIG. 1, an automated roaming and resolution system 100 is illustrated. The system 100 includes a network 110 (e.g., Internet) where one or more roaming devices 120 can establish communications across the network. The system 100 includes a resolution provider 130 for determining network address for the devices 120 and a discovery component 140 to facilitate the automated address determinations. An event component 150 can be provided to update the resolution provider 130 or the discovery component 140 with routing changes of the devices 120 as they move from location to location. A traversal component 160 can be provided to isolate the devices 120 or route addresses from the network 110 to the devices or alternatively provide firewall support. The traversal component 160 can include one or more network address translators (NAT) that operate according to a plurality of NAT protocols. Such protocols enable communications between one or more end-user applications.

In one aspect, the system 100 provides a system where the location of associated devices 120 can be resolved without generally requiring centralized servers or Internet infrastructure changes. The resolution provider 130 can store a friendly device name, GUID, Public IP/Port pair, Private IP/Port pair, NAT tunnel expiration time, and port for routing to a device, for example. Device Resolution providers can run on a well-known port at a static or dynamic IP that can be reached via a DNS lookup, for example. The devices 120 can register their current location with one or more device resolution providers, if desired. The resolution provider 130 is generally accessible using a friendly name from a Domain Name Service (DNS). The resolution provider 130 responds to requests for transport addresses of friendly device names or GUID. Also, the resolution provider 130 may have access control lists (ACLs) for queries and can authenticate location updates via secure socket e.g., SSL/TLS using client and server certificates, shared secret or other type security mechanism.

The system 100 allows for automatically determining and configuring communications capabilities between roaming or mobile network devices 120. Problems with conventional systems having to manually configure and pre-register with a large server system are mitigated by creating a resolution service that hosts can employ to discover an Internet Protocol (IP) address and port number of an associated roaming service along with additional service information. For instance, after a device 120 or component has obtained an IP address and mapped a port through a Network Address Translator (NAT) component 160, the device can contact the respective resolution service 130 and thus register its corresponding IP/Port pair in an automatic manner. Likewise it can contact the same or another resolution service 130 to automatically/ dynamically locate other network components of interest. The resolution service can exist at a static IP address and at a well known port number if desired, but can also include dynamic components using a DYN-DNS (Dynamic Domain Name Service), for example via a well-known or predetermined port identity. It could also be located using PNRP (Peer Name Resolution Protocol) to DNS gateway PNRP directly or another name to address resolution service.

The resolution service or provider 130 can resolve addresses using its internal database of transport addresses. Hosts interested in contacting services on roaming hosts would generally contact the resolution provider 130 or service to determine the last known IP address and port for roaming devices 120. These mobile hosts can then directly contact the service at that IP/Port pair. One benefit of this solution over other possible solutions is that it generally does not require a central server or Internet infrastructure modifications. A specific example of a problem solved by the system 100 is two or more laptops traveling across different locations with a Web Service on one laptop and a Web Service client on another. As can be appreciated, various communications applications can be supported. Other aspects include NAT traversal systems and methods such that cascaded NAT components 160 can be traversed in one example to support the automated address determinations port mappings for the device 120.

Figure 2:
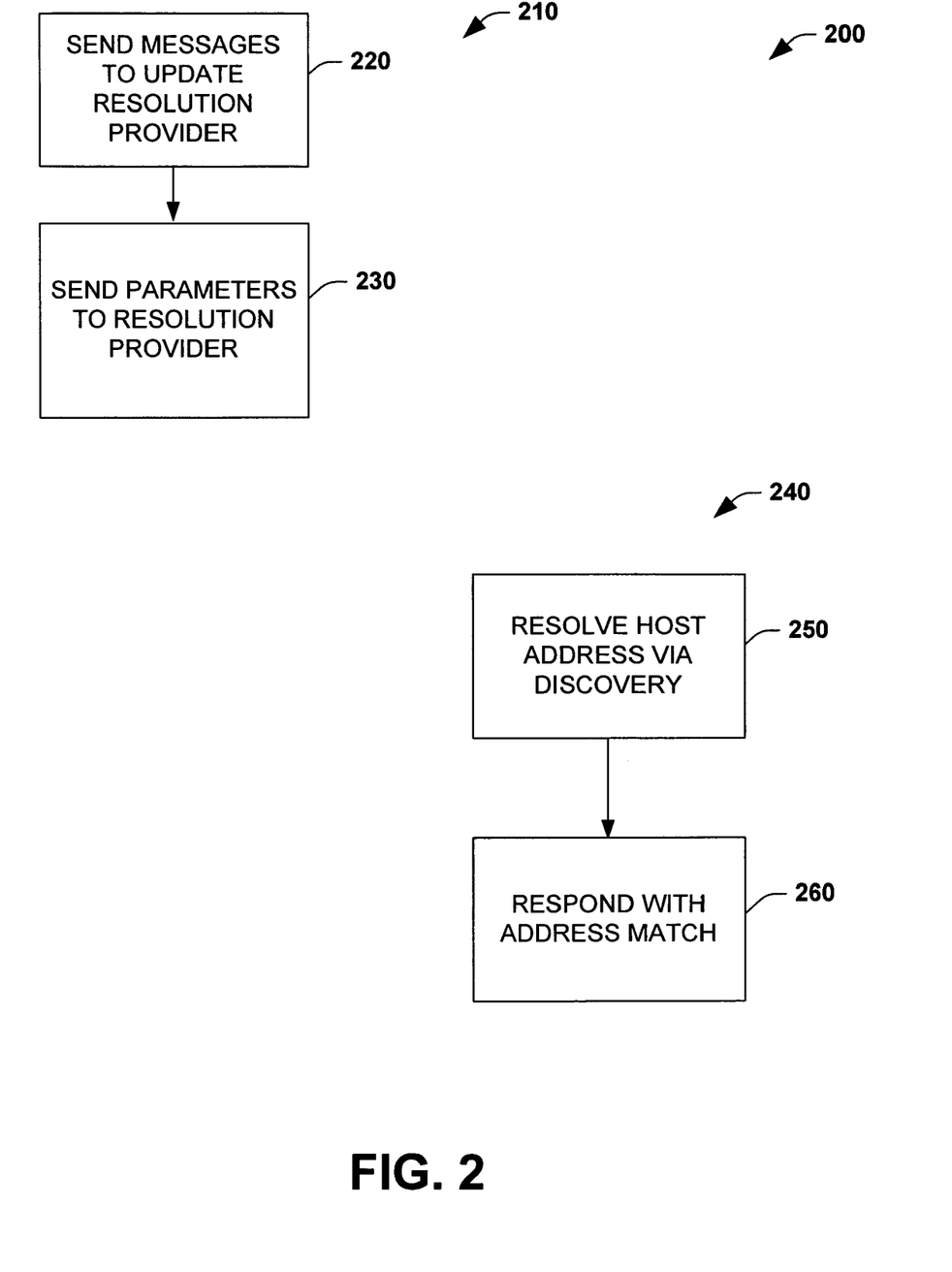
FIG. 2 is a flow diagram illustrating a resolution provider process.
Figure 3:
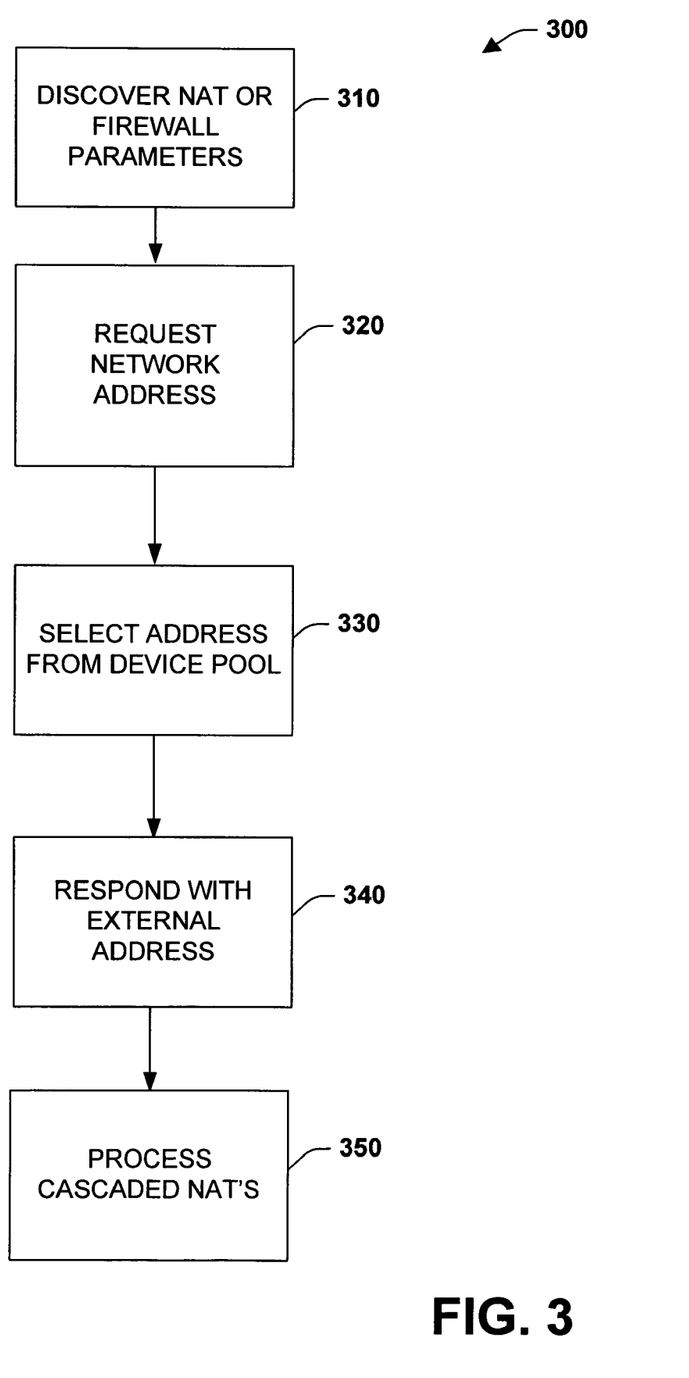
FIG. 3 is a flow diagram illustrating an NAT resolution process.

FIGS. 2 and 3 illustrate automated address resolution processes for roaming devices. While, for purposes of simplicity of explanation, the methodologies are shown and described as a series or number of acts, it is to be understood and appreciated that the subject methodology is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as described herein.

Referring now to FIG. 2, an exemplary resolution provider process 200 is illustrated. In this aspect, at 210, a method is illustrated for updating a resolution provider with a current host transport address. This includes sending a message to update a resolution provider at 220, and sending parameters to the resolution provider at 230. For instance, a roaming host service sends a SOAP message using e.g., a WS-Eventing message to the resolution provider with a change of location event. At 230, this event includes the services' friendly name, GUID, Routable Public IP/Port pair, Private IP/Port pair, IP address lease time and NAT tunnel lease time, for example.

At 240, a method is provided for determining a roaming host's Service Address and IP port. This includes resolving a host's address via directed WS-discovery at 250 and responding with a transport address match to the discovery request at 260. In this example, to resolve a host's Service Address and port, a client host uses a globally unique identifier (GUID) and performs a resolve using directed discovery to the resolution provider. At 260, the resolution provider responds with a resolve-match containing the address and port information for the host's service address.

FIG. 3 illustrates an example process 300 for traversing Network Address Translators. A method 300 for updating a resolution provider with a current host address and for opening cascaded network address translators (NAT). The process 300 includes automatically discovering NAT or firewall parameters at 310 and requesting a network address at 320. From this, an address is selected for a roaming device from a device pool at 330. At 340 a resolution provider responds to a device with an external address for communications, whereas at 350, a plurality of cascaded NATs are automatically opened. To illustrate the process 300, the following examples can apply.

A host that is hidden behind a NAT or Firewall should first discover that they are shielded from the Internet and cannot receive external initiated connections. The host desiring to gain external access should use e.g., WS-Discovery to search for a WSD enabled NAT or firewall. The host will then request an external IP address and port pair from a WSD enabled NAT/firewall. The host may present security credentials to the NAT/Firewall to demonstrate it is authorized to receive externally initiated connections. The NAT/Firewall can select an Internet Protocol (IP) address from its device IP pool and a port from the pool for that IP address and then map the port and IP to the host's internal IP/port pair. The NAT/firewall can then respond to the host device with the externally mapped IP address and port number, along with lease time, for example. At 350, a process for opening cascaded NATs is provided. For example, when a host is located behind two or more NATs that are cascaded, it is the responsibility of the lower NAT to perform a e.g., WS-Discovery for upstream NATs/FW and request to map the port and IP address for the host to one of its external ports. In turn, the upstream NAT/FW can map a routable IP/port pair and return that value to the lower NAT. Credentials for the host device or lower NAT can be employed to authorize each NAT to open ports.

Figure 4:
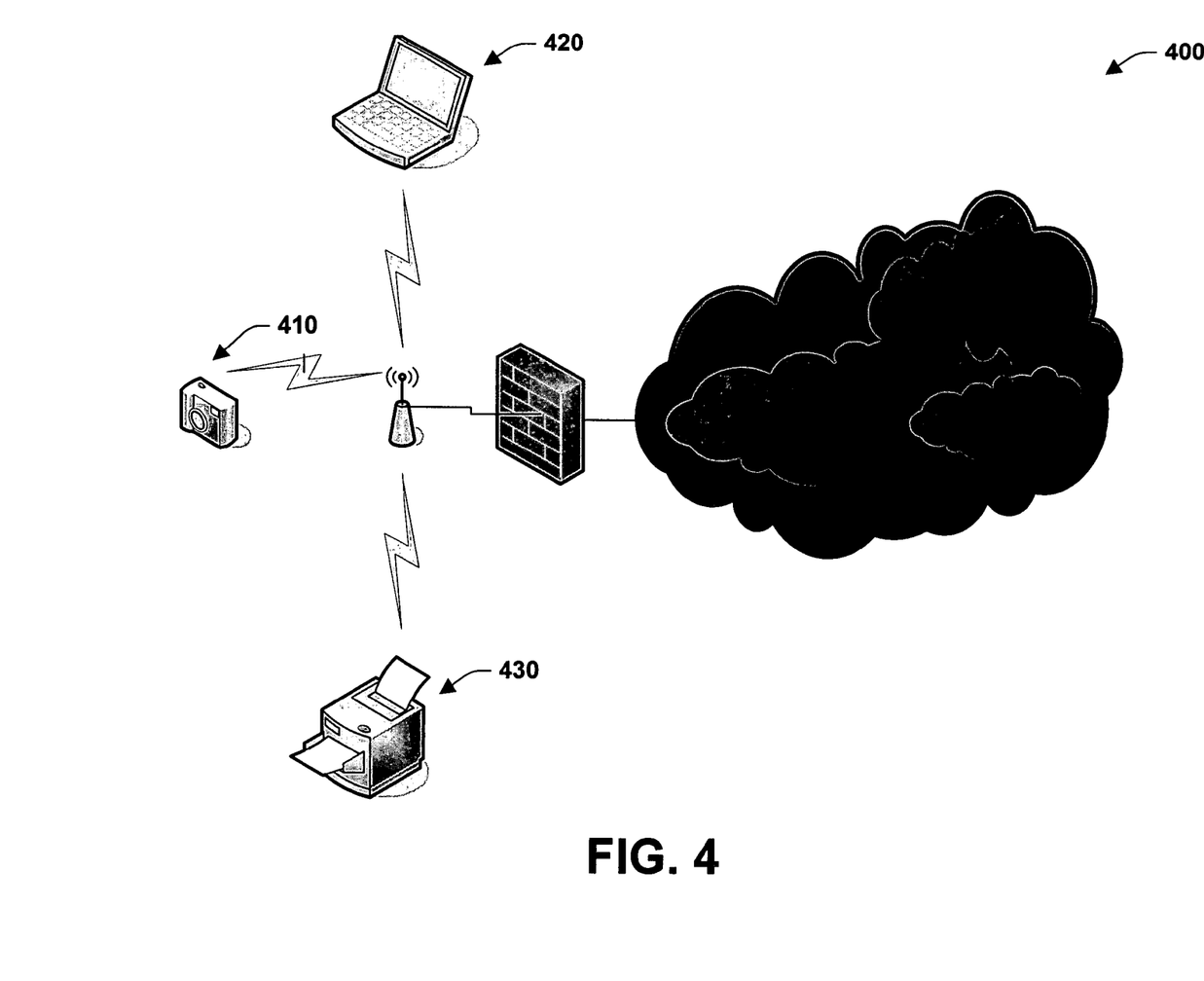
FIGS. 4-7 illustrate example systems for automated address resolution determinations.

FIG. 4 illustrates an example system 400 for address resolution. In this example, a digital camera client 410 for a WS Storage Service in an Internal Network is provided. The camera 410 stores images directly on a personal computer 420 according to the following sequence: A Storage Service (WSSS) requests an external IP/Port pair using e.g., Web Services based Internet Gateway Device (IGD) wsdl. Then, a WSSS sends registration update to its resolution service which can be in the IGD. The IGD stores external IP/port and internal IP/port pair for WSSS and an IGD Discovery service listens for resolution requests for WSSS. The camera 410 connects to Discovery Service on IGD's external address and IGD detects resolution message originated from locally mapped device. The IGD resolves to storage service's internal IP and port pair, and the camera 410 connects directly to Laptop's 420 storage service. The camera 410 (or any network device) can also repeat this for printer service 430 or substantially any other service.

Figure 5:
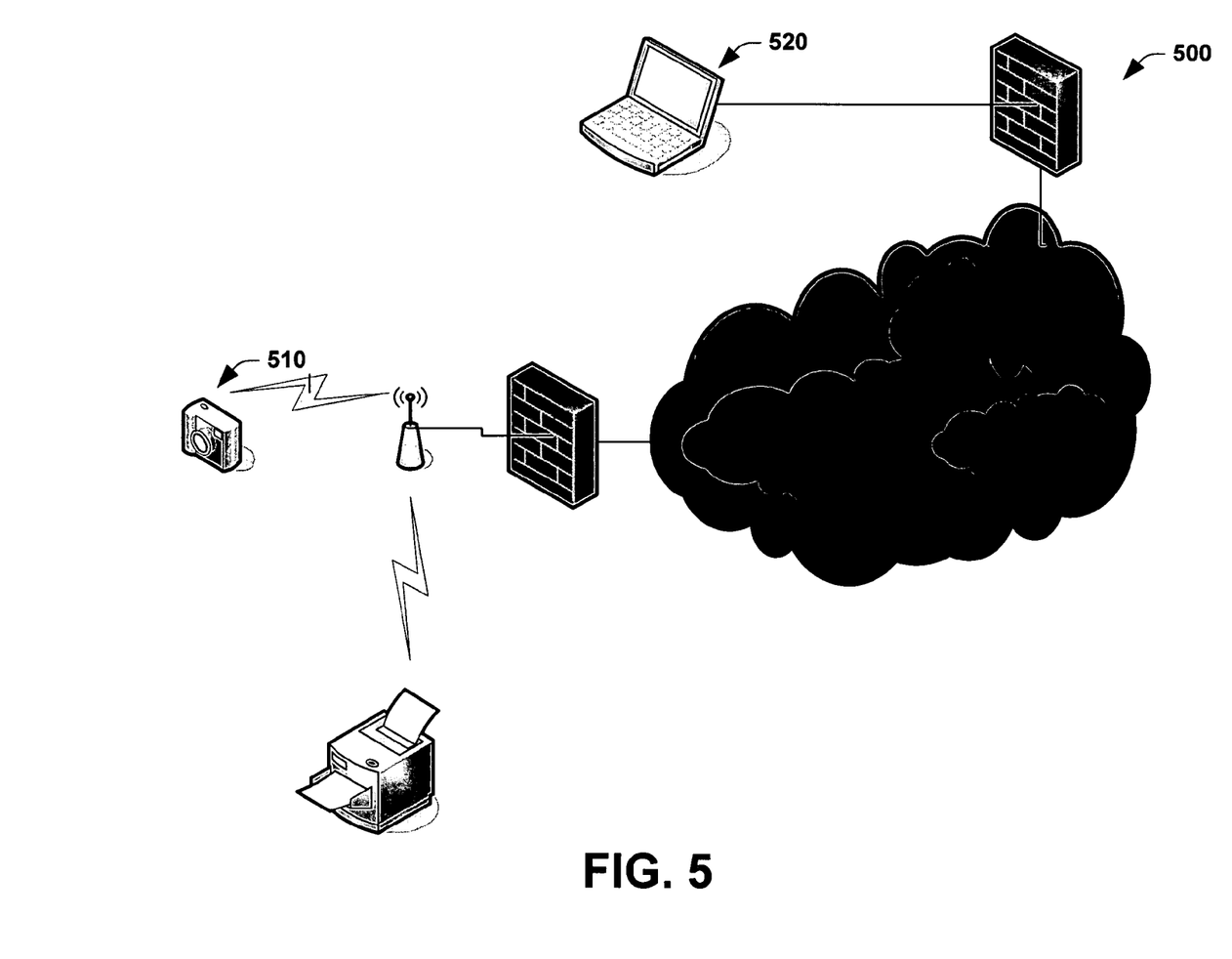

Proceeding to FIG. 5, an external network location resolution system 500 is illustrated. In this example, the example system 500 can operate as follows: A camera 510 (or other roaming device) connects to Discovery service on an IGD's external address and updates its transport address information. The storage service 520 moves to a new network and updates the transport address information on the IGD. The camera 510 communicates with the storage service 520 so it sends a resolution request to the IGD. The IGD resolves to the storage service's public IP and port pair across the Internet, for example. The camera 510 then connects directly to the Laptop's storage service via its public address and reverse NAT. The storage service may need to resolve the camera and it is able to do so by sending a resolve message to the IGD.

Figure 6:
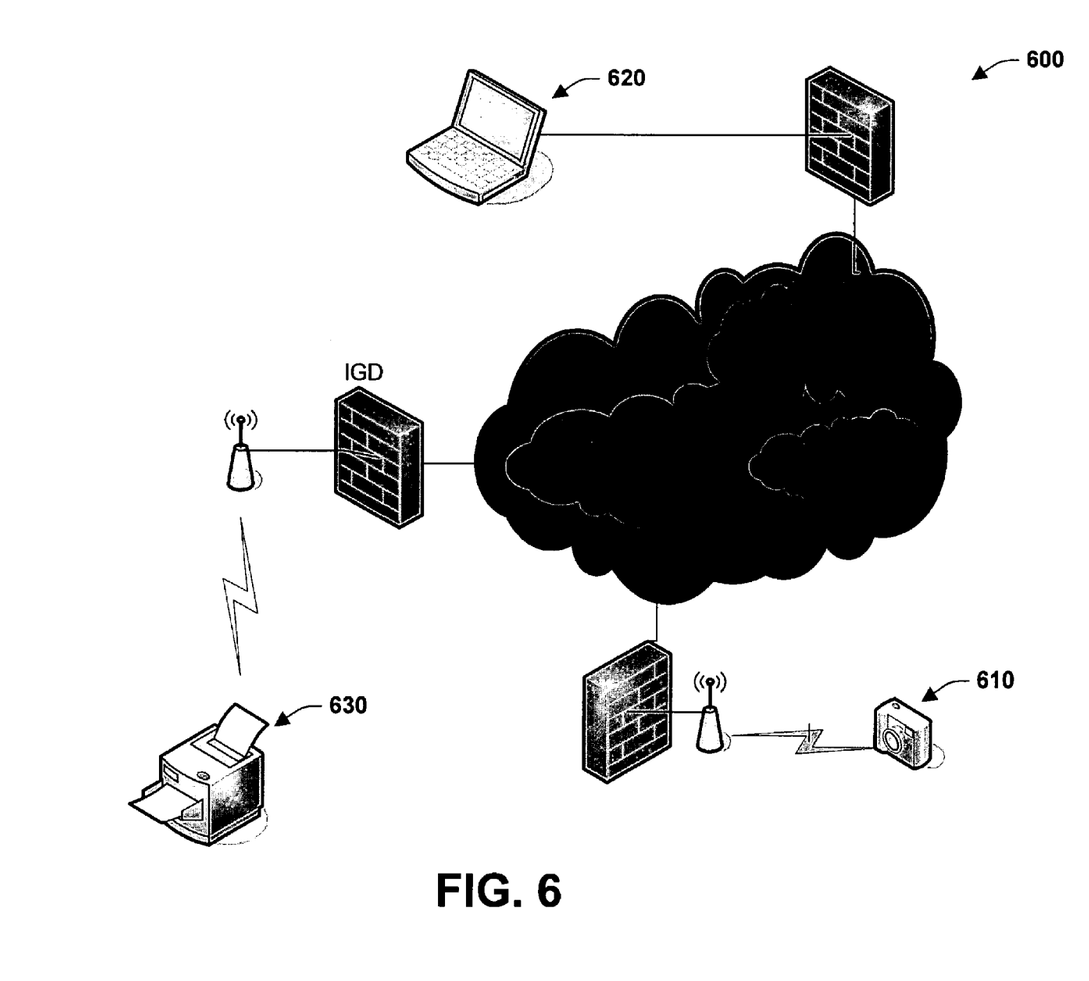

Proceeding to FIG. 6, an alternative external network location resolution system 600 is illustrated. In this example, the example system 600 operates as follows: A camera 610 (or other device) connects to Discovery service on an IGD's external address. The IGD resolves to storage service's public IP and port pair. The camera 610 connects directly to a Laptop's 620 storage service via public address and reverse NAT. The camera 620 repeats query for printer's 630 (or other device) Web Service and connects to printer or other device via public address of IGD and reverse NAT.

Figure 7:
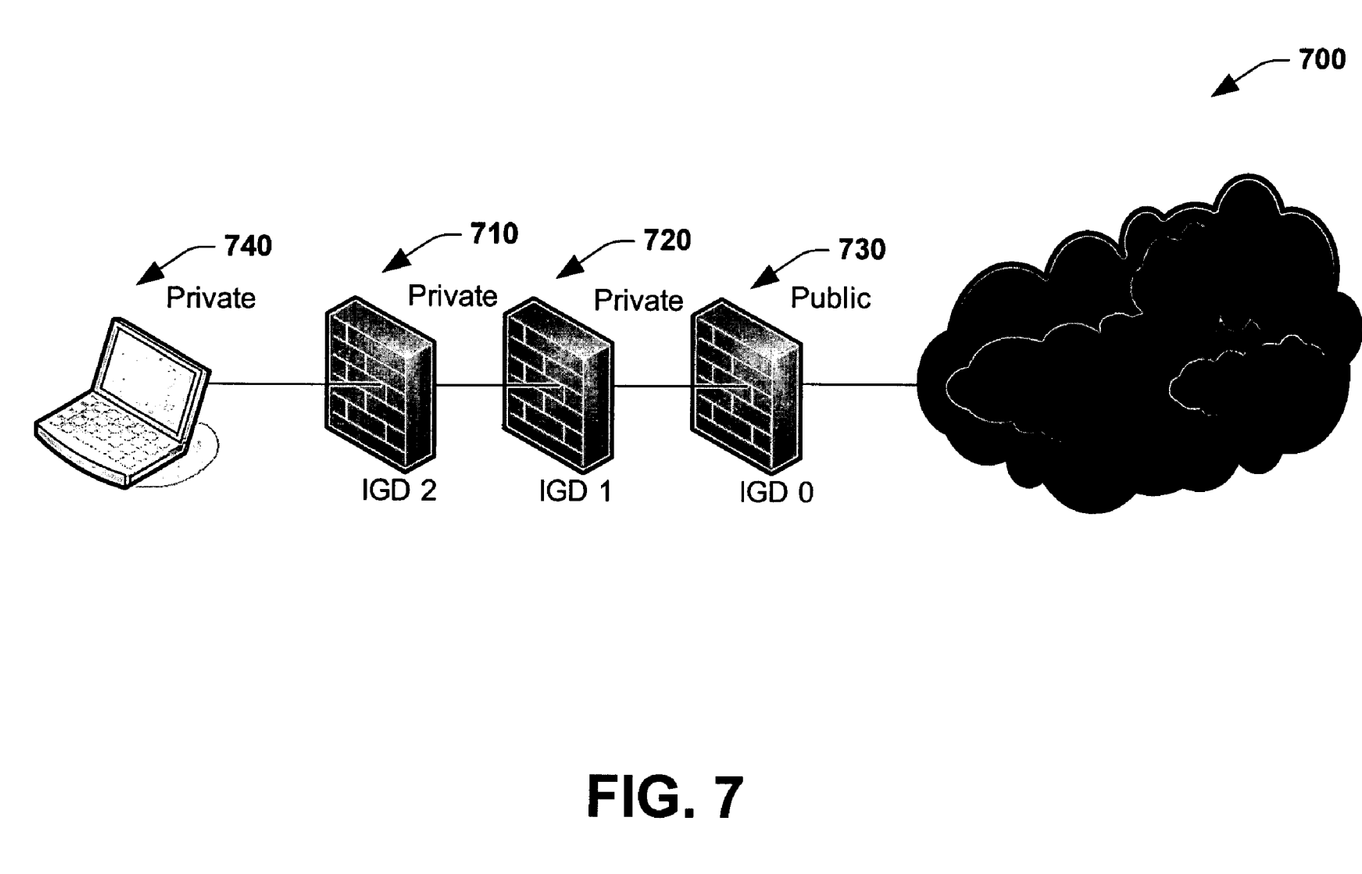

Referring to FIG. 7, an example network address translator traversal system 700 is illustrated. In this example, the system provides an Internet routable IP address and port to a WSD device and provides a TCP tunnel on that routable IP/port pair to the WSD device that may be behind one or many NATs. For instance, this can include an IGD2 (710) and IGD1 (720) as WSD client and servers, where an IGD0 (730) is a WSD server and discovery proxy. A laptop 740 requests external IP and port pair from local IGD (IGD 2) 710. IGD2 maps a port and requests external port pair mapping from upstream IGD1 (720). IGD1 maps a port and requests external port pair mapping from Upstream IGD0 (730). IGD0 maps port and responds to IGD1 (720) with external IP address and port pair and lease time. IGD1 passes external IP/port to IGD2 (710) which passes the IP/port pair to the laptop 740 (or other computing device). The laptop 740 can now use external IP/port pair to register its location with a resolution provider.

Figure 8:
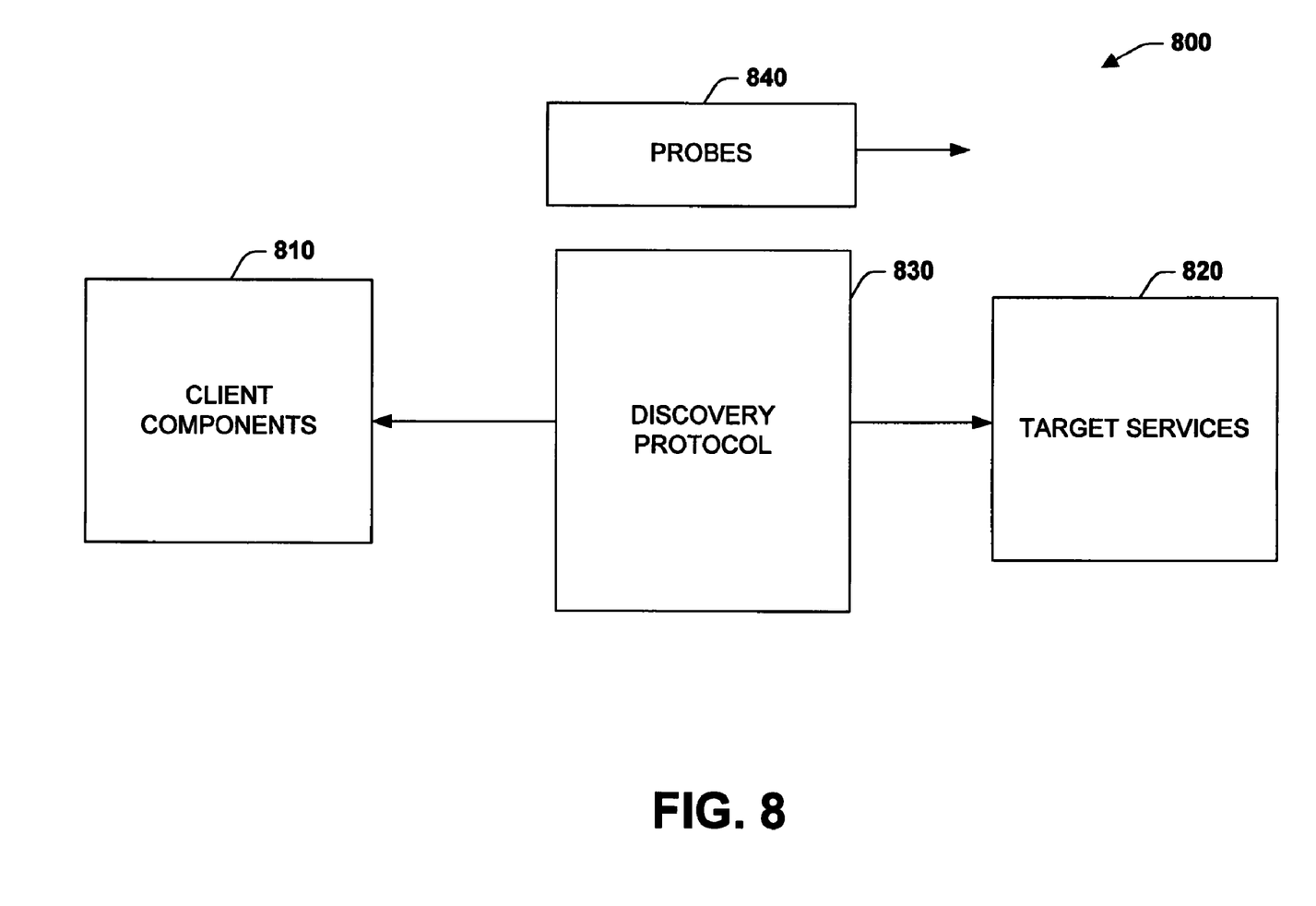
FIG. 8 is an example discovery system for clients systems and services.

FIG. 8 is an example discovery system 800 for clients systems and services. The system 800 includes one or more clients 810 that seek to communicate to one or more target services 820 via a discovery protocol 830. As illustrated, one or more probes 840 may be directed between the clients 810 and services 830 in order to establish connections, wherein respective messages may be directed from the services in response to the probes.

In general, a multicast discovery protocol can be provided to locate services 820. The primary mode of discovery is a client 810 searching for one or more target services 820. To find a target service 820 by the type of the target service, a scope in which the target service resides, or both, a client sends the probe message 840 to a multicast group; target services that match the probe send a response directly to the client 810. To locate the transport address of a target service by name, the client 810 sends a resolution request message to the same multicast group, and again, the target service 820 that matches sends a response directly to the client. To minimize the need for polling, when a target service joins the network, it sends an announcement message to the same multicast group. By listening to this multicast group, clients 810 can detect newly-available target services without repeated probing.

To scale to a large number of endpoints, multicast suppression behavior can be provided if a discovery proxy is available on the network. Specifically, when a discovery proxy detects a probe or resolution request sent by multicast, the discovery proxy sends an announcement for itself. By listening for these announcements, clients detect discovery proxies and switch to use a discovery proxy-specific protocol. However, if a discovery proxy is unresponsive, clients revert to use the protocol described herein.

To support networks with explicit network management services like DHCP, DNS, domain controllers, directories, and so forth, clients and/or target services may be configured to behave differently than defined herein. For example, another specification may define a well-known DHCP record containing the address of a discovery proxy, and compliance with that specification may require endpoints to send messages to this discovery proxy rather than to a multicast group. While the specific means of such configuration can be provided in a variety of differing processes, it is expected that any such configuration would allow clients and/or target services to migrate smoothly between carefully-managed and ad hoc networks. Multiple discovery proxies can also be used. For example, a cell phone may update its transport address on a work discovery proxy and a home discovery proxy. Clients resolving the locating on that cell phone can use either proxy to resolve it.

The following illustrates and XML example for an example probe message:

```
(01) <s:Envelope
(02) xmlns:a="http://schemas.xmlsoap.org/ws/2004/08/addressing"
(03) xmlns:d="http://schemas.xmlsoap.org/ws/2004/10/discovery"
(04) xmlns:i="http://printer.example.org/2003/imaging"
(05) xmlns:s="http://www.w3.org/2003/05/soap-envelope" >
(06) <s:Header>
(07) <a:Action>
(08) http://schemas.xmlsoap.org/ws/2004/10/discovery/Probe
(09) </a:Action>
(10) <a:MessageID>
(11) uuid:0a6dc791-2be6-4991-9af1-454778a1917a
(12) </a:MessageID>
(13) <a:To>urn:schemas-xmlsoap-org:ws:2004:10:discovery</a:To>
(14) </s:Header>
(15) <s:Body>
(16) <d:Probe>
(17) <d:Types>i:PrintBasic</d:Types>
(18) <d:Scopes
(19) MatchBy="http://schemas.xmlsoap.org/ws/2004/10/discovery/ldap" >
(20) ldap:///ou=engineering,o=examplecom,c=us
(21) </d:Scopes>
(22) </d:Probe>
(23) </s:Body>
(24) </s:Envelope>
```

Lines (07-09) in the above example indicate the message is a Probe, and Line (13) indicates it is being sent to a well-known address [RFC 2141]. Since there is no explicit ReplyTo SOAP header block [WS-Addressing], any response to this Probe will be sent as a UDP packet to the source IP address and port of the Probe transport header. Lines (17-21) specify two constraints on the Probe: Line (17) constrains responses to Target Services that implement a basic print Type; Lines (18-21) constrain responses to Target Services in the Scope for an engineering department, for example. Generally, only Target Services that satisfy both of these constraints will respond. Though both constraints are included in this example, a Probe is not required to include either.

The following XML example illustrates an example probe match in response to the probe message described in the above example.

```
(01) <s:Envelope
(02) xmlns:a="http://schemas.xmlsoap.org/ws/2004/08/addressing"
(03) xmlns:d="http://schemas.xmlsoap.org/ws/2004/10/discovery"
(04) xmlns:i="http://printer.example.org/2003/imaging"
(05) xmlns:s="http://www.w3.org/2003/05/soap-envelope" >
(06) <s:Header>
(07) <a:Action>
(08) http://schemas.xmlsoap.org/ws/2004/10/discovery/ProbeMatches
(09) </a:Action>
(10) <a:MessageID>
(11) uuid:e32e6863-ea5e-4ee4-997e-69539d1ff2cc
(12) </a:MessageID>
(13) <a:RelatesTo>
(14) uuid:0a6dc791-2be6-4991-9af1-454778a1917a
(15) </a:RelatesTo>
(16) <a:To>
(17) http://schemas.xmlsoap.org/ws/2004/08/addressing/role/anonymous
(18) </a:To>
(19) </s:Header>
(20) <s:Body>
(21) <d:ProbeMatches>
(22) <d:ProbeMatch>
(23) <a:EndpointReference>
(24) <a:Address>
(25) uuid:98190dc2-0890-4ef8-ac9a-5940995e6119
(26) </a:Address>
(27) </a:EndpointReference>
(28) <d:Types>i:PrintBasic i:PrintAdvanced</d:Types>
(29) <d:Scopes>
(30) ldap:///ou=engineering,o=examplecom,c=us
(31) ldap:///ou=floor2,ou=b42,ou=anytown,o=examplecom,c=us
(32) </d:Scopes>
(33) <d:XAddrs>http://prn-example/PRN42/b42-1668-a</d:XAddrs>
(34) <d:MetadataVersion>75965</d:MetadataVersion>
(35) </d:ProbeMatch>
(36) </d:ProbeMatches>
(37) </s:Body>
(38) </s:Envelope>
```

Lines (07-09) in the probe response message above indicate this message is a Probe Match, and Lines (13-15) indicate that it is a response to the Probe message preceding this example response. Since the Probe did not have an explicit ReplyTo SOAP header block, Lines (16-18) indicate that the response was sent to the source IP address and port of the transport header of the Probe. Lines (22-35) describe a single Target Service. Lines (23-27) contain a stable, unique identifier for the Target Service that is constant across network interfaces, transport addresses, and IPv4/v6. In this case, the value is a UUID scheme URI, but it may be a transport URI (like the one in Line 33) if it meets stability and uniqueness requirements. Line (28) lists the Types (see, e.g., [WSDL 1.1]) implemented by the Target Service, in this example, a basic print type that matched the Probe as well as an advanced print type.

Lines (29-32) list two administrative Scopes, one that matched the Probe as well as another that is specific to a particular physical location. Line (33) indicates the transport addresses where the Target Service may be reached; in this case, a single HTTP transport address. Line (34) contains the version of the metadata for the Target Service; this version is incremented if there is a change in the metadata for the Target Service (including Lines 28-33).

Figure 9:
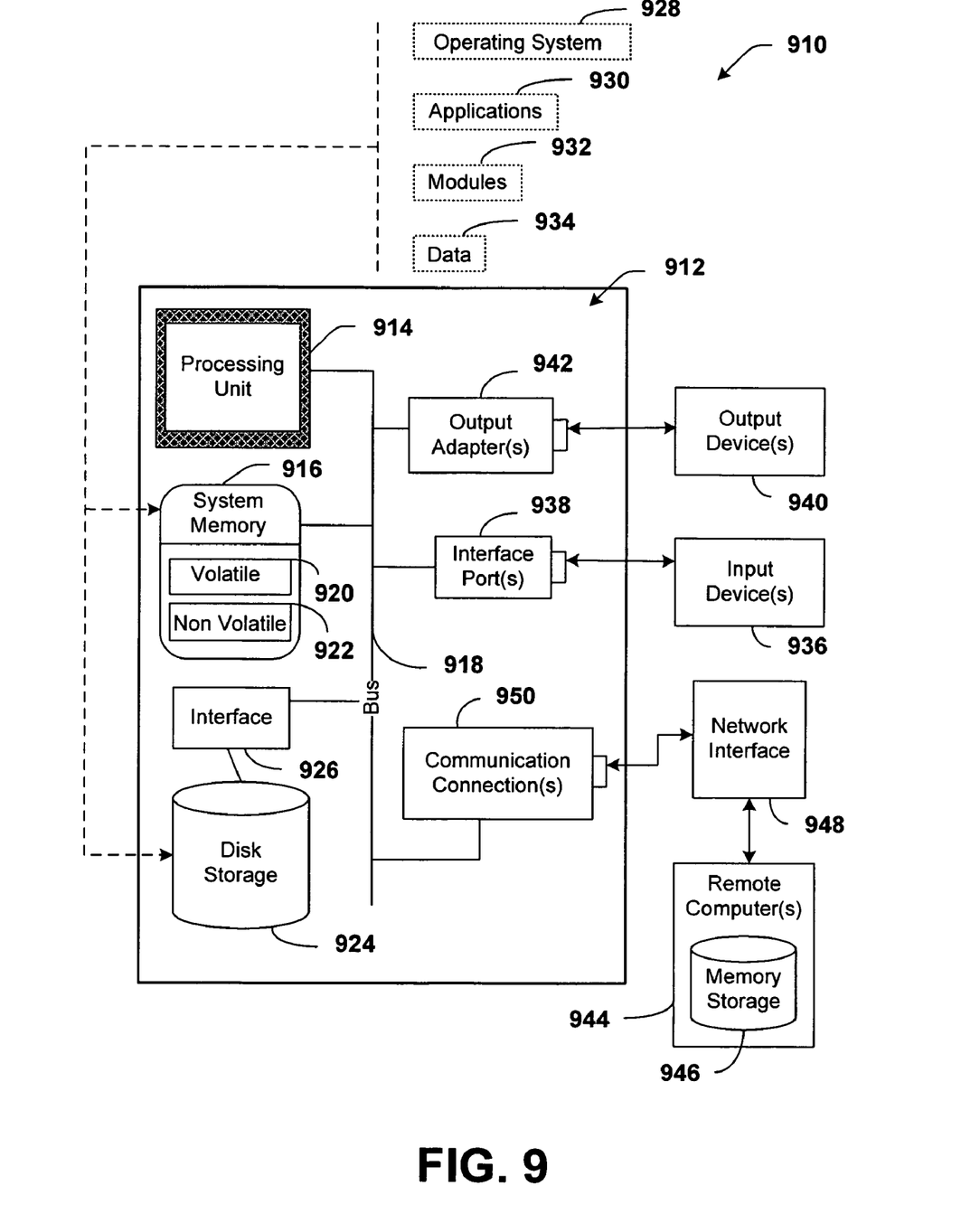
FIG. 9 is a schematic block diagram illustrating a suitable operating environment.
Figure 10:
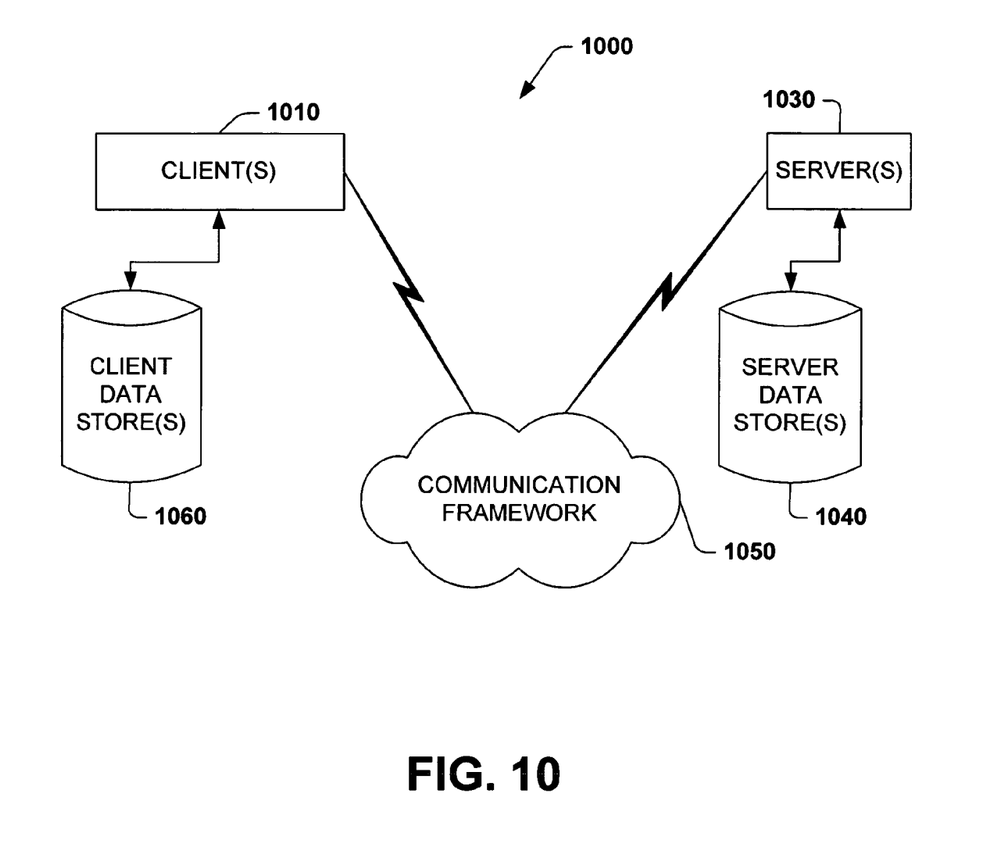
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects can be practiced on stand-alone computers. In a distributed computing environment, program modules may be located in both local and remote memory storage devices.

With reference to FIG. 9, an exemplary environment 910 for implementing various aspects includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), CardBUS, Bluetooth, Firewire 1394, and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (RDRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the subject matter disclosed herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940, that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, Digital Subscriber Lines (DSL), 802.11G, 802.11A/B, 802.11N, Zigbee, Ultra Wideband, Bluetooth, IRDA, and IP/USB.

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A network communications system, comprising:
at least one processor executing computer executable instructions to provide:
a resolution provider configured to:
receive a Simple Object Access protocol message and store address information for a least one network device including one or more of a service friendly name, a GUID, a routable public address and port pair, an address lease time, or a tunnel lease time provided by the Simple Object Access protocol message; and
automatically determine a network address and port information for at least one network device providing a target service in response to receiving a resolution request from a client device; and
facilitate opening ports behind a network address translator (NAT) arranged in a cascade of network address translators (NATs), by processing security credentials of the client device to access the NAT and returning an external address and port information for communication with the NAT if the client device is authorized; and a discovery component configured to:
map the external address and port information of the client device to an external port of the NAT; and
facilitate determination of the network address for the at least one network device by:
receiving a first probe message from the client device, wherein the first probe message includes at least one desired characteristic related to the target service; and
sending a second probe message to the at least one network device providing the target service having the at least one desired characteristic, the second probe message comprising information including the at least one desired characteristic and an address of the client device to enable the at least one network device to respond to the first probe message by sending a response message directly to the client device using the address.

2. The system of claim 1, further comprising at least one Network Address Translator component.

3. The system of claim 2, further comprising a query component that is associated with a client that is employed to determine and select one or more NAT types.

4. The system of claim 1, further comprising an event component to update the resolution provider with roaming address information.

5. The system of claim 1, further comprising at least one protocol discovery component to determine connections between the client device and the at least one network device comprising the target service.

6. The system of claim 1, further comprising a component to update the resolution provider with a current host address.

7. The system of claim 1, further comprising a component to determine a roaming host service address and port.

8. The system of claim 1, further comprising a computer readable medium having computer readable instructions stored thereon for executing the resolution provider or the discovery component.

9. A network discovery method, comprising:
with at least one processor performing the method comprising:
processing a Simple Object Access protocol message to store address information for a least one network device including one or more of a service friendly name, a GUID, a routable public address and port pair, an address lease time, or a tunnel lease time;
sending a probe message from at least one roaming client component to at least one target service via an intermediary discovery service, the probe message including at least one response constraint related to the at least one target service;
receiving a probe response message communicated directly to a source IP address associated with the at least one roaming client from the at least one target service, the probe response message including information that indicates that the at least one target service satisfies the at least one response constraint; and
automatically determining network addresses and ports information for the at least one-target service based in part on the probe response message;
facilitating opening of ports for two or more cascaded network address translators (NATS), by processing security credentials of the at least one roaming client to access the NATs, returning an external address and port information for communication with the NATs if the at least one roaming client is authorized, and mapping the external IP address and port information of the at least one roaming client to an external port of the NATs.

10. The method of claim 9, further comprising:
directly communicating with the at least one target service from the at least one roaming client component.

11. A network discovery system, comprising:
at least one processor executing:
- means for processing a Simple Object Access protocol message to store address information for a least one network device including one or more of a service friendly name, a GUID, a routable public address and port pair, an address lease time, or a tunnel lease time provided by the Simple Object Access protocol message;
- means for communicating between a client and at least one target network component;
- means for sending a probe message to the at least one target network component from the client via an intermediary discovery service, wherein the probe message includes at least one response constraint related to the at least one target service;
- means for receiving a probe response message from the at least one target network component, the probe response message including information that indicates that the at least one target network component satisfies the at least one response constraint;
- means for determining network addresses and ports information for the at least one target network component based on communications between the client and the at least one target network component; and
- means for opening of ports for two or more cascaded network address translators (NATS), by at least processing security credentials of the client to access the NATs, returning an external address and port information for communication with the NATs if the client is authorized, and mapping the external IP address and port information of the client to an external port of the NATs.

12. A network communications system, comprising:
at least one processor executing computer executable instructions to provide:
- a resolution provider implemented on an internet gateway device and configured to:
  - receive a Simple Object Access protocol message and store address information for a least one network device including one or more of a service friendly name, a GUID, a routable public address and port pair, an address lease time, or a tunnel lease time;
  - automatically determine a network address and port information for at least one network device providing a target service in response to receiving a resolution request from a client device; and
  - facilitate opening of ports for two or more cascaded network address translators (NATS), by at least processing security credentials of the client device to access the NATs, and returning an external address and port information for communication with the NATs if the client device is authorized;
- a discovery component implemented on the internet gateway device and configured to:
  - map the external IP address and port information of the client device to an external port of the NATs; and
  - facilitate determination of the network address for the at least one network device by receiving a first probe message from the client device, wherein the first probe message includes at least one desired characteristic related to the target service, and sending a second probe message to the at least one network device providing the target service, the second probe message comprising information including the at least one desired characteristic and a transport header designating a source IP address and a port of the client device to enable the at least one network device to respond to the first probe message by sending a response directly to the client device as a UDP packet to the designated source IP address and port;
- an event component to update the resolution provider or the discovery component with routing changes of the client device and/or the at least one network device; and
- a traversal component configured as a communication intermediary between the client device and a public network.

13. The system of claim 1, wherein the client device comprises a camera and the at least one network device comprises a storage device or a printer.

* * * * *